(12) United States Patent
Levchik et al.

(10) Patent No.: US 8,772,424 B2
(45) Date of Patent: Jul. 8, 2014

(54) CURABLE PHOSPHORUS-CONTAINING FLAME RETARDANT EPOXY RESIN

(75) Inventors: Sergei V. Levchik, Croton-on-Hudson, NY (US); Andrew Mieczyslaw Piotrowski, Yorktown Heights, NY (US); Joseph Zilberman, Haifa (IL); Stephen J. Chaterpaul, Elmont, NY (US)

(73) Assignee: ICL-IP America Inc., Ardsley, NY (US)

( * ) Notice: Subject to any disclaimer, the term of this patent is extended or adjusted under 35 U.S.C. 154(b) by 252 days.

(21) Appl. No.: 13/286,806

(22) Filed: Nov. 1, 2011

(65) Prior Publication Data

US 2012/0283357 A1    Nov. 8, 2012

Related U.S. Application Data

(60) Provisional application No. 61/411,634, filed on Nov. 9, 2010.

(51) Int. Cl.
| | | |
|---|---|---|
| *B32B 27/38* | (2006.01) | |
| *C08L 63/00* | (2006.01) | |
| *C08L 63/04* | (2006.01) | |
| *C08G 59/42* | (2006.01) | |
| *C08G 59/50* | (2006.01) | |
| *C08G 59/62* | (2006.01) | |

(52) U.S. Cl.
USPC .......... 525/523; 428/413; 525/481; 525/504; 525/508; 525/533; 528/108

(58) Field of Classification Search
None
See application file for complete search history.

(56) References Cited

FOREIGN PATENT DOCUMENTS

| | | |
|---|---|---|
| CN | 101200573 A * | 6/2008 |
| EP | 120981 A1 * | 10/1984 |
| WO | WO 2006/026616 A1 * | 3/2006 |

OTHER PUBLICATIONS

HCAPLUS 1985:16133 for European Patent No. 120,981 A1, Oct. 10, 1984 and registry No. 3049-24-9 for triphenyl phosphonate, two pages.*

* cited by examiner

*Primary Examiner* — Robert Sellers
(74) *Attorney, Agent, or Firm* — Dilworth & Barrese, LLP

(57) ABSTRACT

This invention relates to an epoxy resin composition, in particular a curable phosphorus containing flame retardant epoxy resin composition comprising epoxy resin and an epoxy resin chain-extending amount of a diaryl alkylphosphonate and/or diaryl arylphosphonate and a cross-linking agent. The curable flame retardant compositions are useful in e.g., printed wiring boards or molding compounds for electronic applications, protective coatings, adhesives, as well as structural and decorative composite materials.

12 Claims, 1 Drawing Sheet

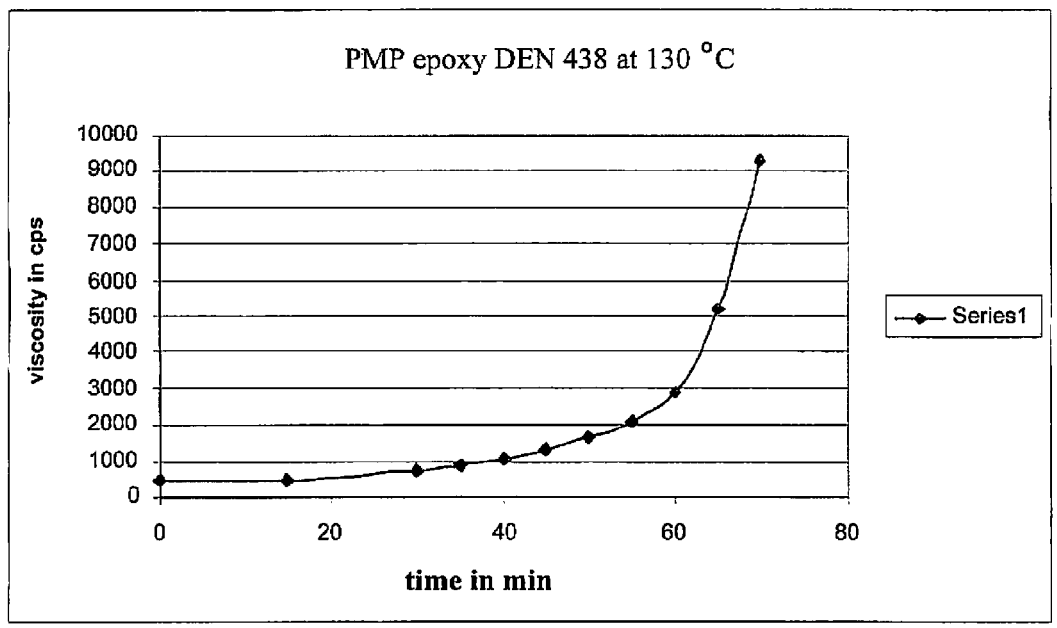

CURABLE PHOSPHORUS-CONTAINING FLAME RETARDANT EPOXY RESIN

This application claims the priority benefit of U.S. Provisional Application Ser. No. 61/411,634 filed Nov. 9, 2010, the entire contents of which are incorporated by reference herein.

BACKGROUND OF THE INVENTION

This invention relates to flame retardant epoxy resin compositions, in particular curable flame retardant epoxy resin compositions comprising epoxy resin and an epoxy resin chain-extending amount of a diaryl alkylphosphonate and/or diaryl arylphosphonate and a cross-linking agent. The curable flame retardant epoxy resin compositions are particularly useful in e.g., coatings, adhesives, and composites.

Flame retardant epoxy resins are used in a variety of electrical insulating materials due to the excellent self-extinguishing properties, mechanical properties, water-vapor, resistance and electrical properties. It is conventional in the preparation of epoxy-containing laminates to incorporate into the epoxy resin composition various additives to improve the flame-retardancy of the resulting laminate. Many types of flame retardant additives have been suggested, however, the additives which are most widely used commercially are halogen-containing additives, such as tetrabromobisphenol A, or epoxy resins prepared with tetrabromobisphenol A.

Although halogen-containing fire-retardant additives such as tetrabromobisphenol A are effective, they are considered by some to be undesirable from an environmental standpoint, and in recent years there has been increasing interest in the formulation of halogen-free epoxy resins, which are able to meet the fire retardancy requirements which is typically V-0 in the standard "Underwriters Laboratory" test method UL 94.

There are some commercially available phosphorus-based fire retardant additives which may be useful for replacing halogen-containing fire-retardant additives. For example, by incorporating an addition-type phosphorus system flame-retardant such as triphenyl phosphate (TPP), tricresyl phosphate (TCP), cresyldiphenyl phosphate (CDP), resorcinol bis(diphenyl phosphate) (RDP), bisphenol A bis(diphenyl phosphate) (BDP) and the like which are a phosphate system compound, into an epoxy resin composition, the flame retardancy can be achieved. Examples of such formulations are described, for example, in U.S. Pat. Nos. 5,919,844; 5,932,637; 6,348,523; 6,713,163 and European Patent Application 1,359,174. However, since phosphorus compounds such as those described above do not react with an epoxy resin, other problems arise such as, decrease in solder heat resistance after moisture absorption and the reduced resistance to chemicals such as the alkali resistance of molded articles. Because of significant plasticizing effect of these phosphorus additives glass transition temperature ($T_g$) of the cured epoxy resin also finds significant drop.

Proposals have been made to use reactive phosphorus-based flame retardants instead of halogenated fire retardants in epoxy resin formulations. Overview of the state-of-the-art in phosphorus-based flame retardant epoxy resins was given in "Review on thermal decomposition, combustion and flame-retardancy of epoxy resins" by S. Levchik and E. Weil, Polymer International, Vol. 53, 2004, pp. 1901-1929. In some formulations phosphorus flame retardant was pre-reacted with an epoxy resin to form a di- or multifunctional epoxy resin which is then cured with a cross-linker.

The prior art describes the use of certain phosphorus-containing compounds as crosslinking or curing agents for use with epoxy resins as a way to introduce a phosphorus element into epoxy resin systems. For example, U.S. Pat. Nos. 4,973,631; 5,086,156; 6,403,220; 6,740,732; 6,486,242; 6,733,698 and 6,887,950 describe the use of difunctional or trifunctional phosphine oxides as effective curing agents. The above-mentioned prior art compositions are not easily prepared and require tedious preparation procedures.

The most often utilized phosphorus-based flame retardant for epoxy resins is 9,10-dihydro-9-oxa-10-phosphenanthrene 10-oxide (DOPO). There are two commonly known methods of applying DOPO to epoxy composites. In the first method DOPO is pre-reacted with epoxy resin as described in European Patent Application 0,806,429 and U.S. Pat. Nos. 6,645,631; 6,291,627 and 6,486,242. Because DOPO is a monofunctional reactive compound it terminates epoxy chains and therefore only multifunctional, usually more expensive then difunctional epoxies, must be used in this process. In the second method DOPO is pre-reacted with quinone or ketone type of compounds, having apart from these functionalities also two or more hydroxyl groups or amine groups as described, for example, in European Patent Applications 1,103,575 and 1,537,160 and U.S. Pat. Nos. 6,291,626; 6,441,067; 6,933, 050; 6,534,601; 6,646,064; 6,762,251 and 6,984,716 and in PCT Patent Publication 05/118604. This method suffers from the complexity which results in expensive compounds with low phosphorus content.

It would be therefore advantageous to provide a flame-retardant phosphorus-containing compound that could be derived from practical, industrial scale raw materials; and thus, would offer an economic advantage over the prior art processes.

Alkyl and aryl phosphonates in general are compatible with epoxy resins. In particular lower alkyl phosphonates are of value because they contain a high proportion of phosphorus, and are thus able to impart good fire retardant properties upon resins in which they are incorporated. Examples of use of the phosphonates in epoxy resins are shown for example in PCT Patent Publication 99/00451 and European Patent Application 0,758,654. However, if phosphonates are used as additives they suffer similar problems as non-reactive phosphates described above. The main problems with non-reactive phosphonates are low glass transition temperature and high moisture absorption of epoxy compounds. The laminates containing high levels of moisture tend to blister and fail, when introduced to a bath of liquid solder at temperatures around 260° C. for lead-based solder or around 288° C. for lead-free solder, a typical step in the manufacture of printed wiring boards.

Use of hydroxyl-terminated poly(m-phenylene methylphosphonate) in epoxy systems was described in PCT Patent Publication 03/029258. Here the epoxy resin was cured by poly(m-phenylene methylphosphonate) in the presence of a methylimidazole curing catalyst. PCT Patent Publication 04/060957 discloses the above-mentioned polyphosphonate which has been pre-reacted with epoxy resin, prior to curing process. Furthermore, this polyphosphonate effectively cures epoxy resin as described by T. Wu, A. M. Piotrowski, Q. Yao and S. V. Levchik in Journal of Applied Polymer Science, Vol. 101, pp. 4011-4022. Because the phosphonate is effectively incorporated in the epoxy network the final cured composite shows high glass transition temperature and low water absorption. PCT Patent Publication 04/060957 describes a process of pre-reaction of epoxy resin with poly (m-phenylene methylphosphonate), however because this polyphosphonate is a multifunctional compound it tends to cross-link epoxy resin and therefore pre-reaction cannot be effectively controlled on commercial scale. S. Minegishi et al describe the reaction of epoxy compounds with phosphonates in Journal of Polymer Science, Part A, Polymer Chemistry, Vol. 37, pp. 959-965. Their goal was to prepare high molecular weight polymeric linear phosphonates with little or no residual epoxy. Such polymers can be used as additive type flame retardants, but cannot be cross-linked because of low concentration or absence of epoxy groups.

Phosphorus-containing compounds have been used heretofore in a variety of epoxy-based polymer systems including, for example, FR-4 laminates for printed circuit boards, protective coatings, as well as structural and decorative composite materials. A driving force for this work has been the search for non-halogenated alternatives to brominated epoxy resins. However, recently another problem associated with electronic materials has been raised. That is, release of lead used in a solder material into the natural environment has become a serious problem and, as one strategy thereto, the use of a lead-free solder has been initiated. Pursuant to this, a solder treating temperature is elevated higher by about 10 to 15° C. than the previous temperature and, thus, there arises a difficulty that the aforementioned techniques cannot deal therewith because of low thermal stability of convenient brominated epoxy resins.

In light of the limitation of the prior art, an object of the present invention is to provide curable flame retardant epoxy resin compositions for use in, e.g., the manufacture of printed-wiring boards and multilayer printed-wiring boards, which does not produce harmful substances upon burning, provides good solder heat resistance after moisture absorption and superior adhesive abilities.

SUMMARY OF THE INVENTION

The present invention is directed to a curable epoxy resin composition comprising an epoxy resin and an epoxy resin chain-extending amount of at least one diaryl alkylphosphonate and/or diaryl arylphosphonate.

The present invention further provides a process for preparing curable flame retardant epoxy resin composition comprising pre-reacting an epoxy resin chain-extending amount of at least one diaryl alkylphosphonate and/or diaryl arylphosphonate with an epoxy resin, optionally in a solvent, to provide linear epoxy oligomer.

The present invention relates to curable phosphorus-containing flame retardant epoxy resin compositions that can be used in, for example, printed wiring boards for electronic applications, protective coatings, as well as structural and decorative composite materials.

BRIEF DESCRIPTION OF THE DRAWINGS

FIG. 1 is a graphical representation of the increase in viscosity of Comparative Example 3 over time.

DETAILED DESCRIPTION OF THE INVENTION

The curable flame retardant epoxy resin composition of the present invention contains, as one essential component, an epoxy resin. The epoxy resins of the present invention include, but are not limited to, for example difunctional, trifunctional, tetrafunctional, and higher functional epoxy resins. Examples of these types of epoxies include, but are not limited to diglycidyl ether of bisphenol A, diglycidyl ether of bisphenol F, diglycidyl ether of bisphenol S as well as the alkyl derivatives such as the C1 to C4 alkyl derivatives. Other examples include diglycidyl-p-aminophenol, triglycidyl aminocresol, triglycidyl-p-aminophenol, tetraglycidyl ethers of methylenedianiline, phenol novolac type epoxy resins, cresol novolac type epoxy resins, resorcinol type epoxy resins, epoxy resins with a naphthalene skeleton, biphenyl type epoxy resins, dicyclopentadiene type epoxy resins, diphenylfluorene type epoxy resins, epoxidized esters of unsaturated fatty acids such as epoxidized linseed oil, di- and polyglycidyl ethers of polyglycols, and the like. These resins can be used individually or in any appropriate combinations. Also, other useful epoxy resin or other resins of this general type that are useful in the present invention are those that have utility for the manufacture of printed wiring boards or other electronic substrate materials. As such, compatible mixtures of any of these resins may be employed, if desired. Among these epoxy compounds, more specific examples are epoxy novolac resins and especially diglycidyl ethers of bisphenols. More specific is the diglycidyl ether of bisphenol A (DGEBA).

The epoxy resin has specifically an epoxy equivalent weight in the range of 180-200 g/equivalent.

This component, i.e., the epoxy resin, is present in an amount that ranges from about 50 to about 90 percent by weight of the total weight of the composition. More specifically, the epoxy resin, is present in an amount that ranges from about 65 to about 90 percent by weight of the total weight of the composition.

The diaryl alkylphosphonate and diaryl arylphosphonate of the present invention are the ones possessing the general structures, respectively, as shown below:

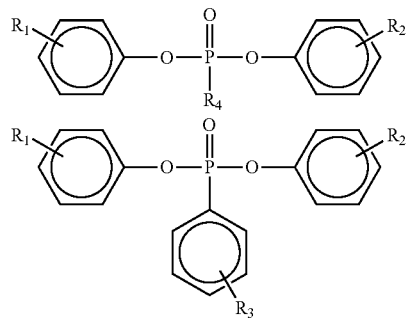

where $R_1$, $R_2$, $R_3$ are same or different, H, lower alkyl having 1 to 8 carbon atoms (e.g. methyl, sec-butyl, 2-ethyl-hexyl), aryl (e.g. phenyl, naphthyl), lower alkaryl and aryl-lower alkyl, cycloalkyl (e.g. cyclohexyl), lower alkoxy having 1 to 8 carbon atoms (e.g. methoxy, n-butoxy), aryloxy, or other substituents with functional groups which are non-reactive with epoxy groups under the conditions of the present invention and do not contain halogen atoms. Examples of such substituents include, but are not limited to, aminodialkyl, nitro, and the like. $R_4$ is a linear or branched alkyl of up to about 16 carbon atoms, specifically from 1 to 6 carbon atoms. The diaryl alkylphosphonate and diaryl arylphosphonate can be prepared by any suitable preparative synthesis, for example by a method described in U.S. Pat. No. 7,541,415 for diaryl alkylphosphonates or a method described by Q. Yao and S. Levchik in Tetrahedron Letters, Vol. 47, pp. 277-281 for diaryl arylphosphonates.

The diaryl alkylphosphonate and diaryl arylphosphonate act as flame retardant agents of the present invention and are present in an amount that ranges from about 10 to about 50 percent by weight of the total weight of the composition. More specifically, the diaryl alkylphosphonate and/or diaryl arylphosphonate are present in an amount that ranges from about 10 to about 35 percent by weight of the total weight of the composition. This amount of diaryl alkylphosphonate and/or diaryl arylphosphonate in the composition ensures that there is from about 1 to about 5 percent by weight of phosphorus element in the total composition. This amount of phosphorous provides the flame retardant properties of the curable epoxy resin composition.

The curable flame retardant epoxy resin compositions of the present invention are unlike those described in U.S. Pat. No. 7,449,526 and PCT Patent Publication 04/060957, because the phosphonates of the present invention are difunctional reagents that ensures chain extension of epoxy resin instead of gellation.

The process of the present invention for the preparation of curable flame retardant epoxy resin comprises pre-reacting at least one diaryl alkylphosphonate and/or diaryl arylphosphonate with an epoxy resin, optionally, in a solvent, to provide linear epoxy oligomer. The process of the present invention further includes the addition of at least one cross-linking agent.

In the reaction between the phosphonate and the epoxy resin compound, the reactants can be employed over a wide range based on the desired properties of the product, i.e. based upon the extent of advancement desired. An excess of the epoxy-containing compound is employed in this invention in order to have a product which is terminated in epoxy groups. In a specific embodiment of preparing curable phosphonate-based epoxy resin of the invention, the reactants are employed in amounts which provide a ratio of aryloxy groups in the diaryl phosphonate per epoxide groups in the epoxy resin of from 0.2:1 to 0.9:1, and more specifically from 0.4:1 to 0.6:1.

According to the invention, the "pre-reacting" can be performed either in the melt or in the presence of a solvent. If the diaryl phosphonate is not soluble in epoxy resin and/or highly viscous products are formed, the presence of inert solvents may be of advantage. Typical solvents in suitable amounts that may be used include, but are not limited to methylethyl ketone, various Dowanols such as propylene glycol methyl ether, dipropylene glycol n-butyl ether, ethylene glycol n-butyl ether, toluene, xylene, N-methyl-2-pyrrolidinone, and the like and mixtures thereof.

Typically, the reaction between diaryl phosphonate and epoxy resin proceeds in the temperature range from 100 to 240° C., but the reaction rate remains quite low at temperatures up to about 150° C. The specific reaction temperatures are from 130° C. to 220° C., and most specific temperatures are from 150° C. to 200° C. At higher temperatures intolerable decomposition or cross-linking may occur thus resulting in the formation of hard, infusible reaction products which render the further processing of the epoxy resin impossible. The reaction can be conducted at any practical subatmospheric and superatmospheric pressure. Usually the reaction is carried out at atmospheric pressure.

According the invention, the pre-reaction between the diaryl phosphonate of the present invention and the epoxy resin is performed in the presence of a catalyst. The catalyst used may be any compound as far as it accelerates the reaction between the diaryl phosphonate and the epoxy resin.

In one non-limiting embodiment the phase transfer catalyst (PTC) is selected from the group consisting of quaternary phosphonium salts, thermally stable tertiary amines having a boiling point higher than about 140° C., quaternary ammonium salts, thermally stable phosphines having a boiling point higher than about 140° C., imidazoles, inorganic salts and bases (LiCl, AlCl$_3$, NaOH etc) and combinations thereof.

In one another embodiment of the invention the PTC catalyst is a quarternary phosphonium salt described by the formula:

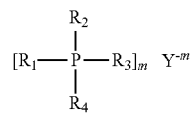

wherein each $R_1$, $R_2$, $R_3$ and $R_4$ independently is a hydrocarbyl or inertly substituted hydrocarbyl radical containing from 1 to about 16 carbon atoms, specifically from 1 to about 6 carbon atoms, Y is an anion and m is the valence of the anion. In one embodiment, Y is an anion selected from the group consisting of bromide, fluoride, chloride, iodide, acetate, acetate complex, acetate/acetic acid complex, phosphate, phosphate complex, hydrogen sulfate and hydroxide. In one embodiment, m can be 1, 2 or 3.

Specific quaternary phosphonium salts are selected from the group consisting of, but not limited to, for example, tetrabutylphosphonium chloride, tetrabutylphosphonium bromide, tetrabutylphosphonium iodide, tetrabutylphosphonium acetate complex, tetraphenylphosphonium chloride, tetraphenylphosphonium bromide, tetraphenylphosphonium iodide, ethyltriphenylphosphonium chloride, ethyltriphenylphosphonium bromide, ethyltriphenylphosphonium iodide, ethyltriphenylphosphonium acetate complex, ethyltriphenylphosphonium phosphate complex, n-propyltriphenylphosphonium chloride, n-propyltriphenylphosphonium bromide, propyltriphenylphosphonium iodide, butyltriphenylphosphonium chloride, butyltriphenylphosphonium bromide, butyltriphenylphosphonium iodide, ethyltri-p-tolylphosphonium acetate/acetic acid complex, ethyltriphenylphosphonium acetate/acetic acid complex, hexadecyltributylphosphonium bromide, tetramethylene bis (triphenylphosphonium bromide), methylene bis(triphenyl phosphonium bromide) or combinations thereof, and the like, as are described in U.S. Pat. Nos. 5,208,317, 5,109,099 and 4,981,926, the contents of each of which are attached hereto as part of the subject disclosure and are incorporated herein by reference in their entirety.

Tertiary amine catalysts, which are thermally stable under the conditions of the present process and which have a boiling point higher than about 140° C. are those such as, for example, 2- or 4-(dimethylamino)pyridine, N-methylmorpholine and combinations thereof.

In another embodiment of this invention the PTC catalysts are imidazole type compounds represented by the following general formula:

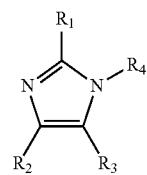

wherein each $R_1$, $R_2$, $R_3$ and $R_4$ independently is a hydrogen, or hydrocarbyl or inertly substituted hydrocarbyl radical, containing from 1 to about 16 carbon atoms, specifically from 1 to about 6 carbon atoms.

Specific imidazole type phase transfer catalysts are selected from but not limited to the group 1-methylimidazole;

2-methyl imidazole; 2-ethylimidazole, 2-propylimidazole, 2-butylimidazole, 2-pentylimidazole, 2-hexylimidazole, 2-cyclohexylimidazole, 2-phenylimidazole, 2-nonyl-imidazole, 2-undecylimidazole, 2-heptadecylimidazole, 2-phenyl-4-methylimidazole, 1-benzylimidazole, 1-ethyl-2-methylbenzimidazole, 2-methyl-5,6-benzimidazole, 1-vinylimidazole, 1-allyl-2-methylimidazole, 2-cyanoimidazole, 2-chloroimidazole, 2-bromoimidazole, 1-(2-hydroxypropyl)-2-methylimidazole, 2-phenyl-4,5-dimethylolimidazole, 2-phenyl-4-methyl-5-hydroxymethylimidazole, 2-chloromethylbenzimidazole, 2-hydroxybenzimidazole, 2-ethyl-4-methylimidazole; 2-cyclohexyl-4-methylimidazoles; 4-butyl-5-ethylimidazole; 2-butoxy-4-allylimidazole; 2-carboethyoxy-butylimidazole, 4-methytimidazole; 2-octyl-4-hexylimidazole; 2-methyl-5-ethylimidazole; 2-ethyl-4-(2-ethylamino)imidazole; 2-methyl-4-mercaptoethylimidazole; 2,5-chloro-4-ethylimidazole; and mixtures thereof.

Phosphine catalysts, which are thermally stable under the conditions of the present process and which have a boiling point higher than about 140° C., can be those selected from the group consisting of triaryl phosphines, alkyl diaryl phosphines, dialkyl aryl phosphines, trialkyl phosphines, where the aryl is a substituted or unsubstituted phenyl and the alkyl is a linear, branched or cyclic $C_4$-$C_{16}$ hydrocarbyl radical, and combinations thereof.

In yet another embodiment of the invention, the PTC catalyst is a quaternary ammonium salt. More specific PTC catalysts among quaternary ammonium salts are selected from the group consisting of, but not limited to, for example, tetraethylammonium bromide, tetrabutylammonium chloride, tetrabutylammonium bromide, tetrabutylammonium hydrogen sulfate, methyltrioctylammonium chloride, benzyl triethylammonium chloride and combinations thereof.

Other suitable catalysts will be easily recognized by the skilled person. Especially suitable phase transfer catalysts are ethyltriphenylphosphonium acetate, tetrabutylphosphonium bromide, tetrabutylammonium bromide, 4-(dimethylamino) pyridine, triphenyl phosphine, 2-methylimidazole and 2-phenylimidazole.

The catalyst amount can be selected by those skilled in the art for specific reaction conditions. Generally the catalyst is used in quantity from 0.0001 to about 0.2 mol, and more specifically from 0.005 to 0.05 mol per epoxide equivalent of the epoxy resin. When the catalyst amount is larger than the range, side reactions such as cross-linking may increase.

The typical reaction time of the reaction described herein between diaryl phosphonate and the epoxy resin is between about 0.5 to about 10 hours, specifically between about 1 to about 5 hours.

Importantly, the diaryl alkylphosphonate and/or diaryl arylphosphonate are pre-reacted with epoxy resins in such way that at least one but specifically two of aryloxy groups linked to phosphorus (P—O—Ar) are reacted with the epoxy and linear epoxy oligomers containing phosphonate groups in the chain are formed. Only the aryloxy groups linked to phosphorus participate in this process such that opening epoxy group effectively inserts in the phosphonate ester group as shown in the reaction formula below, for example with diaryl alkylphosphonate:

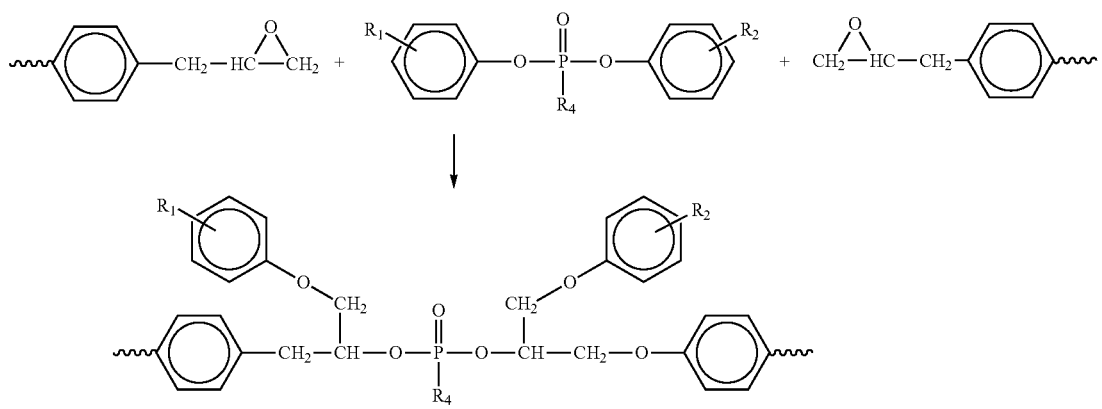

The pre-reacted curable epoxy resin contains from about 1 to about 5% phosphorus by weight and should be completely soluble in organic solvents suitable for epoxy resins dissolution. The pre-reacted curable epoxy resin of the present invention possesses at least one or more and specifically two or more unreacted epoxy groups.

The curable flame retardant epoxy resin composition further contains a cross-linking agent. Suitable cross-linking agents include, but are not limited to the group of compounds capable of reacting with epoxy functionalities to provide cross-linking of the epoxy network. Examples of cross-linking agents include those compounds known in the art and normally used to cure epoxy resins. Examples of such compounds include, but are not limited to, anhydrides of carboxylic acids, for example anhydride of orthophthalic acid, amines, for example dicyandiamide, bis(4-aminophenyl)sulfone, bis(4-aminophenyl)methane, multiphenolic compounds, for example phenol novolac, cresol novolac or bisphenol A novolac resins and the like.

The cross-linking agent is present in the curable flame retardant epoxy resin composition in an amount that ranges from about 3 to about 25 percent by weight of the total weight of the composition. More specifically, the cross-linking agent is present in the curable flame retardant epoxy resin composition in an amount that ranges from about 5 to about 15 percent by weight of the total weight of the composition.

The curable epoxy resin composition of the present invention can contain optional additives, for example, auxiliary flame retardant additives, as well as, the following types of materials: auxiliary curing catalysts, fiber and/or cloth reinforcing additives; mineral fillers, such as $Al(OH)_3$, $Mg(OH)_2$ or silica; release agents; colorants; and the like.

The curable epoxy resins of this invention are intended to be employed in all of the applications for which epoxy resins are known, for example, laminates, composites, encapsulants, coatings, adhesives and castings.

The present invention is further illustrated by the Examples that follow:

Example 1

27 weight % of diphenylmethyl phosphonate (DPMP) was blended with 73 weight % of phenol novolac epoxy resin (epoxy equivalent, EEW=180) at about 70-90° C. To this blend 0.25 weight % of tetrabutylphosphonium bromide was added. 294 g of the blend was placed in an oven at 165° C. After about 30 minutes the resin temperature reached 165° C. and exothermic reaction started with maximum exotherm at about 189° C. The mixture was than cooled to 154° C. and placed in the oven at 175° C. for 1 hour. After reaction mixture was cooled down only 1% molar of residual was DPMP was detected by $^{31}$P NMR. The sample contained about 49% molar of di-insertion product and about 45% molar of mono-insertion product.

Example 2

Two hundred grams of the pre-reacted epoxy of example 1 was combined with six grams of cross-linker dicyandiamide (DICY) and 0.4 grams of curing catalyst, 2-methyl imidazole (2-MI) were poured into a mold in order to prepare a slab of about 1 cm thick and placed into an oven preheated to 165° C. The temperature of the sample reached the temperature of the oven in about 30 minutes and the sample was kept at 165° C. for 1 hour and then the temperature was ramped to 180° C. and the sample was kept at this temperature for 30 minutes. The resulted cured epoxy resin slab, was cut into bars of 3×6 mm thick and 100 mm long. The flammability of the bars was tested in the Oxygen Index apparatus according to ASTM D2863-00 and Limiting Oxygen Index was found to be 31.

Example 3

Cured epoxy resin from Example 2 was placed into liquid nitrogen, crushed into smaller pieces and milled to obtain a powdered material. The powder was extracted using a Soxhlet extractor by methylene chloride for 24 hours. The amount of free DPMP found in the final methylene chloride solution (quantitative GC analysis) accounted for 4.5% of the initial DPMP employed. Thus, 95.5% of the DPMP was incorporated into the resin.

Example 4

119.11 g DPMP was mixed thoroughly with 300 g of bisphenol A epoxy resin (DER 331, EEW=182) at 70° C. Five gram aliquots of this mixture were placed in 16×150 mm culture tubes. Various catalysts were added to the tubes, followed by vortex for 20 seconds. The resultant solutions were then heated to various temperatures over a period of 1 hour. The resins obtained were analyzed by $^{31}$P NMR (Table 1).

| | | | | $^{31}$P NMR integration area, % | |
| --- | --- | --- | --- | --- | --- |
| Entry | Catalyst | Catalyst Loading (wt %)* | Temp., ° C. | DPMP (%) | Mono-insertion product (%) | Di-insertion product (%) |
| 1 | None | 0 | 140 | 98.6 | 0.4 | 0 |
| 2 | Ethyl triphenylphosphonium chloride | 0.5 | 140 | 3.8 | 52.0 | 38.2 |
| 3 | Ethyl triphenylphosphonium bromide | 0.5 | 140 | 29.6 | 54.1 | 10.1 |
| 4 | Ethyl triphenylphosphonium iodide | 0.5 | 140 | 50.3 | 37.6 | 6.1 |
| 5 | Ethyl triphenylphosphonium acetate | 0.125 | 180 | 9.8 | 56.7 | 30.6 |
| 6 | Tetrabutylammonium fluoride | 0.125 | 180 | 44.3 | 41.8 | 6.9 |
| 7 | Tetrabutylammonium chloride | 0.5 | 140 | 21.8 | 55.7 | 15.7 |
| 8 | Tetrabutylammonium bromide | 0.5 | 140 | 51.2 | 37.4 | 4.6 |
| 9 | Potassium fluoride | 0.125 | 180 | 15.1 | 57.5 | 22.9 |
| 10 | 1-Butyl-3-methylimidazolium chloride | 0.5 | 140 | 0.0 | 30.3 | 62.7 |
| 11 | 1-Butyl-3-methylimidazolium chloride | 0.125 | 140 | 0.0 | 40.3 | 59.7 |
| 12 | 1-Methylimidazole | 0.125 | 140 | 0 | 64.6 | 24.3 |
| 13 | 2-Methylimidazole | 0.50 | 140 | 6.5 | 45.0 | 37.7 |
| 14 | Dimethylamino pyridine (DMAP) | 0.125 | 140 | 0 | 49.2 | 50.8 |
| 15 | Piperizine | 0.125 | 140 | 100 | 0 | 0 |

*Based on DPMP-DER331 mixture

As seen from Table 1, in case of 1-butyl-3-methylimidazolium chloride, 1-methylimidazole and DMAP the DPMP had completely reacted with the epoxy resin thus becoming a part of the polymer matrix.

Comparative Example 1

30% by weight DPMP was blended with bisphenol A di-epoxy resin (EEW=185) at about 70-90° C. and then the mixture was heated at 150° C. for 1.5 hours. No catalyst was added. Reaction product was a viscous liquid at room temperature. The reaction was analyzed by $^{31}$P NMR. It contained 20% molar of unreacted DPMP 56% molar of mono-inserted product and 23% molar of di-inserted product.

Comparative Example 2

13.40 g of DPMP was blended with 36.56 g of novolac epoxy resin (EEW=180) at about 70-90° C. To this blend 0.136 g of 2-methylimidazole catalyst was added. Two grams of this sample was placed in the oven at 180° C. Small sample was taken after 45 minutes. It contained 11% molar unreacted DPMP, 25% molar of di-insertion product and 54% molar of mono-insertion product. Sample taken after 60 minutes gelled.

Comparative Example 3

Novolac epoxy resin (EEW=180) was blended with poly (m-phenylene methylphsohonate) Fyrol PMP, brand of Supresta at 70/30 weight ratio. Blending was done at 120° C.

Twenty grams of this blend was placed in a preheated Brookfield DV III Rheometer and viscosity of the blend was measured at 130° C. over time.

The graph in FIG. 1 represents the viscosity change of Comparative Example 3 on time. The data as presented in FIG. 1 shows that the increase in viscosity accelerates quickly after 60 minutes and that Comparative Example 3 gelled after 70 minutes.

Comparative Example 4

Eight grams of DICY was thoroughly dispersed in 200 g of phenol novolac epoxy resin (EEW=180) and then 0.4 grams of 2-methylimidazole was added Then resin was poured in the mold and then firstly cured at 140-145° C. for 1 hour and then post-cured at 185° C. for 30 minutes. The cured resin slab was cut and tested in Oxygen Index apparatus similar to example 2. The Limiting Oxygen Index was found at the level of 26, which is significantly lower that phosphorus-containing resin.

Comparative Example 5

1.2 g of 1,2-bis(diphenyl phosphonate) ethane was mixed thoroughly with 3.8 g of novolac epoxy resin (DER 331, EEW=182) and 50 mg ethyl triphenylphosphonium bromide at 70° C. The sample was then kept at 180° C. for 45 minutes. Phosphorus NMR showed only a single peak identical to the starting material 1,2-bis(diphenyl phosphonate) ethane. No reaction between 1,2-bis(diphenyl phosphonate) ethane and DER 331 took place.

Comparative Example 6

1.2 g of 1,2-bis(diphenyl phosphonate) ethane was mixed thoroughly with 3.8 g of novolac epoxy resin (DEN 438, EEW=180) and 25 mg ethyl triphenylphosphonium bromide at 70° C. The sample was then kept at 220° C. for 60 minutes. Phosphorus NMR showed only a single peak identical to the starting material 1,2-bis(diphenyl phosphonate) ethane. No reaction between 1,2-bis(diphenyl phosphonate) ethane and DEN 438 took place.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

The invention claimed is:

1. A process for preparing curable flame retardant epoxy resin composition comprising pre-reacting an epoxy resin chain-extending amount of at least one diaryl alkylphosphonate and/or diaryl arylphosphonate with an epoxy resin, in the presence of an effective amount of catalyst, optionally in a solvent, to provide linear epoxy oligomer.

2. The process of claim 1 wherein the catalyst is selected from the group consisting of a quaternary phosphonium salt, a thermally stable tertiary amine having a boiling point higher than about 140° C., a quaternary ammonium salt, a thermally stable phosphine having a boiling point higher than 140° C., an imidazole compound and combinations thereof.

3. A prereacted curable epoxy resin composition comprising a pre-reacted curable epoxy resin made by the process of pre-reacting an epoxy resin chain-extending amount of at least one diaryl alkylphosphonate and/or diaryl arylphosphonate with an epoxy resin, in the presence of an effective amount of catalyst to provide pre-reacted curable epoxy resin.

4. The prereacted curable epoxy resin composition of claim 3 further comprising a crosslinking agent.

5. The prereacted curable epoxy resin composition of claim 4 wherein the crosslinking agent is selected from the group consisting of an anhydride of carboxylic acid, amines, multiphenolic compounds and mixtures thereof.

6. The prereacted curable epoxy resin composition of claim 4 wherein the cross-linking agent is present in an amount that ranges from about 3 to about 25 percent by weight of the total composition.

7. A cured epoxy resin made by the process of curing the prereacted curable epoxy resin composition of claim 3.

8. A coating comprising the cured epoxy resin of claim 7.

9. A sealant comprising the cured epoxy resin of claim 7.

10. A composite comprising the cured epoxy resin of claim 7.

11. A laminate comprising the cured epoxy resin of claim 7.

12. A molded item comprising the cured epoxy resin of claim 7.

* * * * *